Nov. 23, 1937.                    E. J. ROBBINS                    2,099,964
                                  MIXING MACHINE
                                Filed May 10, 1937

INVENTOR
Earl J. Robbins
BY Geo. E. Tew
  Geo. A. Tew
  ATTORNEYS

Patented Nov. 23, 1937

2,099,964

UNITED STATES PATENT OFFICE 2,099,964

MIXING MACHINE

Earl J. Robbins, Seattle, Wash.

Application May 10, 1937, Serial No. 141,813

3 Claims. (Cl. 259—3)

This invention relates to mixing machines and is particularly adapted and intended for mixing dough, altho it is capable of use for mixing cement or other materials, and no limitation is implied with respect to the uses to which the machine may be put.

The machine is of the type having a rotating drum, and in which the drum is so supported that it can be tilted to empty the same after the mixing is completed.

Associated with this drum is an internal scraper or blade which is held in contact with the inner surface of the drum preferably at the top or upper part thereof, so that as the drum revolves the scraper, which is held in fixed position by an arm or bracket, will scrape the dough or other material from the upper part of the drum and cause it to fall into or upon the body of dough below. In the mixing of dough this is found to give an advantageous stirring or kneading action which most effectively prepares the dough for the subsequent operations; or in use on any other material will cause the contents of the rotating drum to be dropped and evenly mixed. The machine is suitable for what is known as dry mixing and is therefore particularly useful in making pie dough which requires but little water. It is also capable for use in wet mixing, and the structure is such that the drum can be tilted as much or as little as may be desired or necessary, the preferred position during the mixing operation being at a relatively small angle to the horizontal.

A further improved detail is the manner of supporting the mixing drum in a U-shaped cradle or frame provided with side trunnions and with rings supporting rollers on which the drum rests and rotates, an electric motor being carried by a hanger depending from the cradle and geared to a central trunnion on the rear end of the drum which is supported in a bearing on the rear cross piece of the cradle.

One form of the invention is illustrated in the accompanying drawing in which:—

Figures 1, 2:
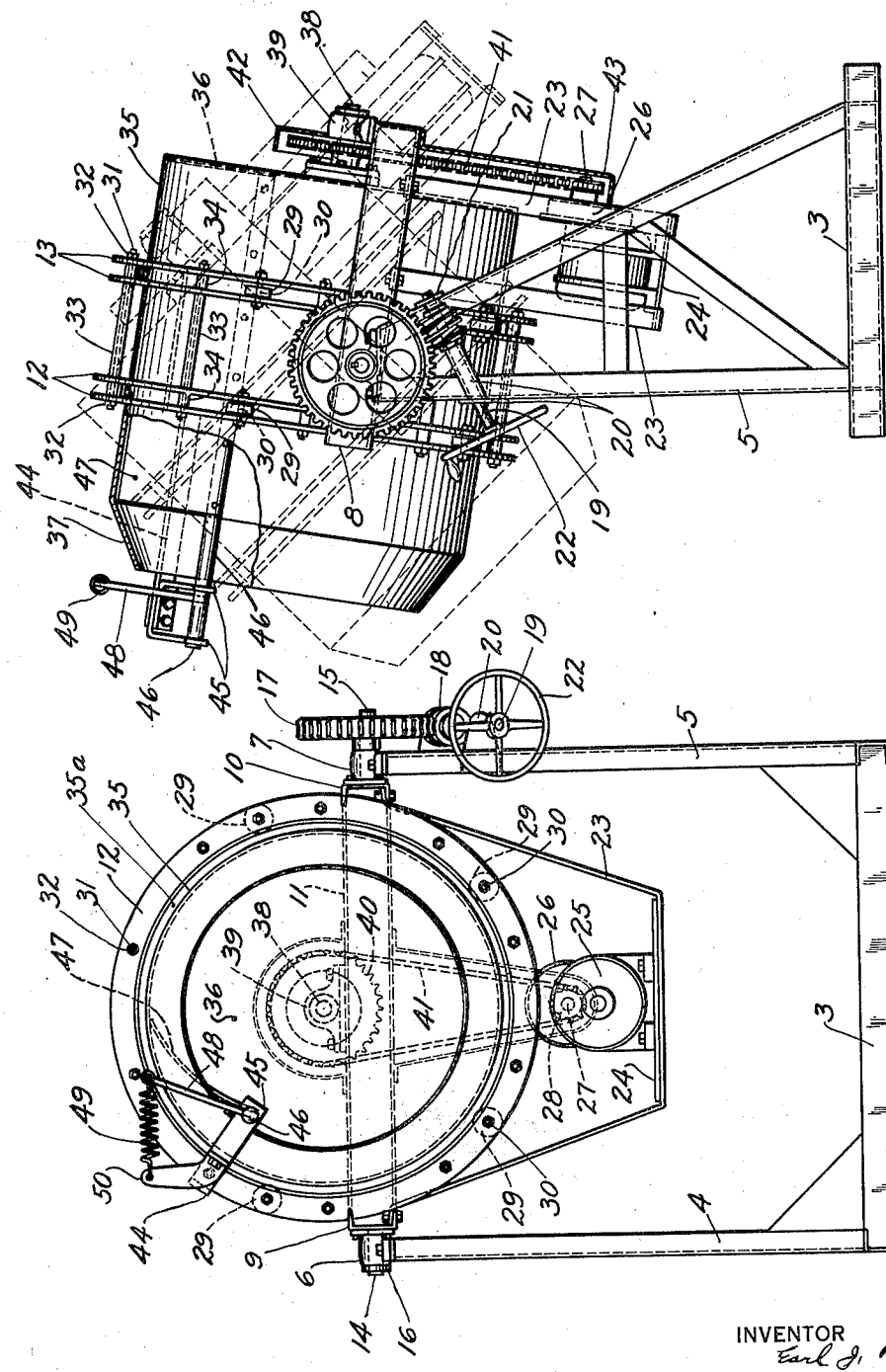
Figure 1 is a front view of mixer with the mixing drum shown in a horizontal position.
Figure 2 is a side view of mixer with parts broken away and the mixing drum shown tilted as when in operation.

Referring particularly to the drawing, reference numeral 3 represents the base upon which is mounted the two side frames 4 and 5. To the top of these side frames are secured bearings 6 and 7 respectively in which is rotatably mounted a frame or cradle represented in its entirety by reference numeral 8 and in which revolves the mixing drum.

The cradle 8 consists in general of a U-shaped frame with two side members 9 and 10, and their common connection 11, and two pairs of rings 12 and 13 secured between the two side members 9 and 10.

Near the ends of the members 9 and 10 of the U frame are secured trunnions 14 and 15 which are supported in the bearings 6 and 7. The outer end of trunnion 14 is provided with a collar 16 and to the outer end of trunnion 15 is keyed a worm gear 17 which meshes with worm 18. The worm 18 is keyed to a shaft 19 rotatably mounted in two brackets 20 and 21 secured to the side frame 5. To one end of shaft 19 is secured a hand wheel 22.

To the under side of the cradle 8 is suspended a frame work consisting of two U-shaped brackets 23 supporting a platform 24 upon which is mounted the driving motor 25. In combination with motor 25 is a speed reducing unit 26, with its driving shaft 27 to which is keyed a sprocket 28.

Between each pair of rings 12 and 13 of the cradle are mounted rollers 29 which are preferably made of ball bearings mounted on small shafts 30 secured between the pair of rings 12 and 13. The rings 12 and 13 are tied together by means of tie rods 31 provided with nuts 32, and pipe spacers 33 and 34.

Supported by rollers 29 and free to rotate within rings 12 and 13 is a mixing drum consisting of a cylindrical shell 35 closed at one end by means of a plate 36 so as to form a water tight container. The opposite end of shell 35 is provided with a conical neck 37. Near the middle of and surrounding the shell 35 are two heavy metal bands 35a which serve to stiffen the shell and at the same time serve as tracks for rollers 29.

To the center of bottom plate 36 is secured a trunnion 38 rotatably mounted in a bearing 39 secured to the common connection 11 of the U frame of the cradle 8. Keyed onto trunnion 38 is a sprocket 40. Passing over sprockets 40 and 28 is a sprocket chain 41. 42 and 43 are chain guards.

Secured to the rings 12 and 13 is a bracket or arm 44 provided with a forked end 45 perforated to receive shaft 46. 47 is a curved scraper, one edge of which wipes against the inner surface of shell 35. Near the outer end of shaft 46 is secured a lever 48 perforated at its upper end to receive one end of a tension spring 49, the other end of which is connected to a small arm 50 secured to the bracket 44. From this it will be noted that due to the tension of the spring 49 the upper end of lever 48 will be urged in a counterclockwise direction tending to rotate shaft 46 with it, consequently forcing the upper edge of blade 47 against the shell 35.

The method of operation is as follows: The mixing drum is first turned into the position shown in Figure 2 and the pie dough or other material poured into it. The motor is next set into operation which in turn revolves the drum in a counterclockwise direction (facing the machine as shown in Figure 1). The speed is such that the centrifugal force would carry the dough completely around were it not deflected away by the curved scraper which causes it to fall from approximately the top of the mixing drum into the top of the dough in the bottom of the drum. From this it is evident that a very thorough mixing action takes place. After mixing is complete the machine is stopped, the hand wheel turned till the mixing drum approaches the position shown in the dotted lines and the pie dough allowed to empty out.

I claim:

1. A mixer comprising a supporting frame, a tilting frame supported thereby and including a pair of spaced rings and a U-shaped part each branch of which is secured to both of said rings, and each branch of the U-shaped part having a trunnion located between the rings and supported in a bearing on the main frame, one of the trunnions extending beyond the bearing and provided with a gear wheel, a worm and its shaft supported on the main frame and provided with a hand wheel, said worm engaging the gear, a mixing drum supported in the rings, said drum having a trunnion at its rear end supported by the U-frame, a motor carried by the tilting frame, and transmission mechanism between the motor and the trunnion at the rear end of the drum.

2. A mixer as in claim 1, the motor being supported under the drum by hangers depending from the tilting frame and the transmission including a belt between the motor and the trunnion.

3. A mixer comprising a supporting frame, a tilting frame supported thereby and including a ring, a mixing drum closed at one end and rotatable in the ring, a bracket fixed to the ring and projecting forwardly beside the drum and beyond the open end thereof and provided with an inwardly projecting yoke at its outer end, a rock shaft mounted in the yoke and projecting into the drum, a scraper secured to the inner end of the rock shaft and engaging the interior of the drum, and a spring connected to the rock shaft and tending to turn the same to hold the scraper in contact with the inside of the drum.

EARL J. ROBBINS.